US012582054B2

(12) United States Patent
Clemens

(10) Patent No.: US 12,582,054 B2
(45) Date of Patent: Mar. 24, 2026

(54) METHOD FOR CONTROLLING THE OPENING OF A WORK APPARATUS HAVING PAIRWISE ARRANGED PROCESSING DEVICES FOR VITICULTURE, AND WORK APPARATUS

(71) Applicant: Clemens GmbH & Co. KG, Wittlich (DE)

(72) Inventor: Patrick Clemens, Wittlich (DE)

(73) Assignee: Clemens GmbH & Co., Wittlich (DE)

( * ) Notice: Subject to any disclaimer, the term of this patent is extended or adjusted under 35 U.S.C. 154(b) by 144 days.

(21) Appl. No.: 18/225,969

(22) Filed: Jul. 25, 2023

(65) Prior Publication Data

US 2023/0403996 A1 Dec. 21, 2023

Related U.S. Application Data

(63) Continuation of application No. PCT/DE2022/100061, filed on Jan. 25, 2022.

(30) Foreign Application Priority Data

Jan. 25, 2021 (DE) ..................... 10 2021 101 466.2

(51) Int. Cl.
  *A01G 17/02* (2006.01)
  *G05D 1/00* (2024.01)
(52) U.S. Cl.
  CPC ......... *A01G 17/023* (2013.01); *G05D 1/0246* (2013.01)
(58) Field of Classification Search
  CPC ........................... A01G 17/023; G05D 1/0246
  See application file for complete search history.

(56) References Cited

U.S. PATENT DOCUMENTS

2006/0272201 A1* 12/2006 Pellenc ................ A01B 69/001
                                                          47/1.01 R

FOREIGN PATENT DOCUMENTS

DE        69907328 T2    4/2004
EP         1790211 A1    5/2007
ES         2795500 A1   11/2020
WO     WO-2017209592 A1 * 12/2017 ............. A01D 25/04

OTHER PUBLICATIONS

WO 2017209592 A1—Navorro english trans (Year: 2017).*
International Search Report dated Apr. 21, 2022 in corresponding application PCT/DE2022/100061.
Office Action for Canadian Patent Applicaion No. 3209227 mailed on Mar. 14, 2025.

* cited by examiner

*Primary Examiner* — Abby Lin
*Assistant Examiner* — Renee LaRose
(74) *Attorney, Agent, or Firm* — Muncy, Geissler, Olds & Lowe, P.C.

(57) ABSTRACT

A device and method for controlling the opening of a work apparatus having pairwise arranged processing devices for viticulture. The work apparatus is attached to a work vehicle and comprises at least one piece of holding equipment which reaches over a row of plants and on which at least one of the processing devices is held. At least one processing device (is arranged on each side of the row. A clear opening is able to be established between the processing devices and/or is able to be changed in terms of an opening width and/or an opening length by at least one actuator. At least one image recording is generated by at least one electronic camera at least for at least one field of view.

14 Claims, 7 Drawing Sheets

METHOD FOR CONTROLLING THE OPENING OF A WORK APPARATUS HAVING PAIRWISE ARRANGED PROCESSING DEVICES FOR VITICULTURE, AND WORK APPARATUS

This nonprovisional application is a continuation of International Application No. PCT/DE2022/100061, which was filed on Jan. 25, 2022, and which claims priority to German Patent Application No. 10 2021 101 466.2, which was filed in Germany on Jan. 25, 2021, and which are both herein incorporated by reference.

BACKGROUND OF THE INVENTION

Field of the Invention

The invention relates to a method for controlling the opening of a work apparatus having pairwise arranged processing devices for viticulture, and to a work apparatus therefor.

Description of the Background Art

In viticulture and horticulture, plants are planted in linear arrangements, in so-called rows. Aisles located between the rows allow for the use of work vehicles such as tractors or equipment carrier vehicles, each of which carry at least one work apparatus along the rows. Various types of work can be carried out by the work apparatuses. For this purpose, work apparatuses are often used that have a processing device on both sides of the row in order to be able to process both sides in a single operation. The distance between them varies depending on the type of processing device; in any case, however, obstacles in the row must be avoided.

In viticulture, for example, pre-pruners are used as work apparatuses to carry out winter pruning. The shoots that have grown over the summer and are anchored to the trellis wires must be cut and removed from the trellis system. For this purpose, the pre-pruners are equipped with sets of rotating shearing discs. A piece of holding equipment reaches over the row so that a set of shearing discs is arranged on each side of the row. Both sets of shearing discs together form a so-called basket. The shearing discs are adjusted with a distance of, for example, 10 mm. They rotate in opposite directions, so that material is pulled in. The basket is opened immediately in front of a stake standing in the row, a so-called stickel, by the driver of the tractor by pressing a button. After passing the stickel, the driver releases the button and the basket closes again. There is a remaining area before and after the stickel, which has not been processed by the pre-pruner and which is called an island. The size of the island depends on the skill of the driver and the driving speed. An inexperienced driver usually leaves behind a very large island. It takes a lot of practice to open the pre-pruner so precisely that only a minimal island remains. The smaller the island, the less manual rework required in the plant row.

Having to permanently concentrate on the stickel puts a lot of strain on the driver and tires him out. If the pre-pruner is used at a very early time of the year, there are still a considerable number of leaves in the trellis system, which make it difficult for the driver to recognize the stickels. A low sun in autumn and winter can also restrict the driver's view to such an extent that he is no longer able to see the stickels with sufficient certainty.

If the driver overlooks a stickel, the apparatus hits the stickel. A pressure relief valve recognizes overpressure on the locking cylinder and triggers an emergency opening. The stickel is often damaged despite the emergency opening. In the case of galvanized steel stickels, the zinc layer is damaged. In the case of wood stickels, wood particles are stripped. Older wooden stickels may break off. Plastic stickels are damaged and older plastic stickels break. Concrete stickels damage the shearing discs on the pre-pruner.

DE 699 07 328 T2 shows and describes a work apparatus for viticulture with pairwise arranged processing devices. At least one electronic camera is provided for automated operation. This is said to have so-called artificial vision to recognize plants in the picture. Depending on the plants recognized, the pruning devices are to be adjusted from the outside in the direction of the main shoot of the plant. Pruning in the space between plants arranged one after the other in the direction of cultivation or travel in one row, which also has stickels and trellis wires, is not disclosed.

SUMMARY OF THE INVENTION

It is therefore an object of the invention to enable processing with a work apparatus with pairwise arranged processing devices for viticulture, wherein obstacles in a row such as stickels are automatically recognized and the opening in front of the obstacle is automatically brought about or the opening width is automatically adjusted.

The invention is essentially based on the use of at least one camera that covers a field of view located in front of the at least one pair of processing devices, and an electronic image processing device with which simple geometric structures such as a stickel are easily automatically recognizable. On the one hand, the invention takes advantage of the fact that in viticulture and horticulture the plants are arranged linearly in rows, so that only a linear path has to be followed, and on the other hand, that only straight, i.e., linear planting stakes are used, which are easily identifiable within the naturally grown, thus chaotic formation of the plants.

The method according to the invention ensures that the processing devices are moved outwards in good time before they reach the stickel or another foreign body, so that a collision of the processing devices with the obstacle is safely avoided.

If the processing device is a so-called pre-pruner for viticulture, then the processing devices arranged on both sides of the row and in a pair form a so-called basket and the movement of the processing devices is referred to as basket opening or basket closing.

Both processing devices do not have to be identically designed, and both do not need to be actively driven. For example, a combination of a rotating roller and a counter plate is also possible as a pair. It is also possible to combine several pairs of processing devices into one work apparatus. It is only essential that at least one processing device is arranged on both sides during the processing of the plant row and that the distance between them is able to be changed to such an extent that an obstacle can be avoided.

A swivel or rotational movement of the pair of processing devices can be considered to be equivalent to increasing the internal clear distance between two processing devices in order to avoid an obstacle, wherein the swivel or rotational axis is vertically oriented and in particular positioned approximately in the middle of the row. For example, during processing, the pair of processing devices may be aligned at an angle to the longitudinal extension of the row, so that one processing device is further forward and one further back. The existing opening width is then not fully usable with respect to the direction of travel of the work vehicle and the linear extension of the plant row. If, for example, the pair is aligned at 45° to the plant row, then the opening width that can be used in the direction of travel is only approx. $B_0*\cos(45°)=71\%$. If an obstacle appears, the previously diagonally standing pair of processing devices is swiveled into a position perpendicular to the longitudinal direction of the plant row, so that the full opening width between them can then be used to pass the obstacle.

The field of view captured by a camera contains at least part of a row that is in front of the processing devices in the direction of travel. However, the processing devices themselves can also be located in the field of view.

A linear structure in the sense of the present invention is preferably, but not necessarily, a linear structure. It can also be another non-interrupted structure which is distinguishable from the chaotic structures of natural plant shoots.

The recognition of the linear structure can be carried out in such a way that it is specifically searched, recognized and tracked in the image region on the basis of previously carried out learning runs. An AI (artificial intelligence) unit may be implemented in the control device. The AI unit is taught in that human operators recognize and mark linear structures in a large number of tracking shot images.

Preferably, in the so-called teaching of the AI unit, the criterion of a qualified linear structure is taught, in which an action of the work apparatus is only to be triggered if said linear structure represents an obstacle for the work apparatus. This includes all solid structures that extend up to the height of the working area of the work apparatus to be used. However, this does not include those linear structures that are not critical because they cannot cause damage to the apparatus or the system. Such non-qualified linear structures can be, for example, branches that have randomly grown very straight or artificial parts such as plant protection covers arranged in the lower trunk area as bite protection. In the learning process, such non-critical linear structures are marked as not qualified for the purposes of triggering a signal for the work apparatus. Thus, after completion of the teaching via the AI unit, an automatic distinction can be made between linear structures qualified for signal triggering and non-qualified ones.

Indirect recognition is also possible by recognizing natural structures present in the image region, e.g., in the case of plants on the basis of the coloring of the foliage, if an electronic color camera is used, as compared to the uniform coloring of the artificial obstacle or other typical textures, and that the linear structure is determined indirectly by inversion, i.e., by filtering out all natural structures from the image. Conversely, the color and texture of the stickels can be used as criteria for the selection of a qualified linear structure.

It is possible for the driver to manually trigger the closing of the processing device required after opening, i.e., the return of the processing devices on both sides to their working position, after passing the stickel. If he accidentally does not give this control command, there will be no processing on the plant row, but no damage will be caused either.

However, according to an example of the method, it is provided to also automate the closing movement, for which various methods are possible:

According to a first option, the linear structure, once recognized as a stickel and thus qualifying as an obstacle, is tracked by continuing to analyze for linear structures in the subsequent image recordings taken from the field of view in front of the processing devices. By comparing it with the data obtained from previous recordings, it is possible to track the progressive change in position of the recognized obstacle, such as a stickel, while the work vehicle is moving. As soon as the linear structure has reached a target mark or has completely left the image section, the closing movement can be triggered automatically.

It is also possible for the control device to wait a safety period after the linear structure has disappeared from the image region or after the reaching of a target has been registered, and only then are the processing devices moved back to the working position.

Another advantage of the invention is that the actuators that move the processing devices apart or swivel them pairwise can be designed in a simple manner, for example by a hydraulic or pneumatic cylinder, since only one opening position and one closing position are required as firmly defined end positions. Displacement measurement is possible, but not required. By means of the opening control pulse, the processing devices move completely from the closing position in a preferred embodiment to the mechanically or otherwise limited opening position.

According to a further example, on the one hand the opening width is taken into account, namely the clear width between the pairwise arranged processing devices, and on the other hand the opening length. The opening length is the distance between an opening starting point, at which the processing devices leave their working position and begin to move apart, and an opening end point, at which the processing devices have returned to their working position. By linking the opening width and length, the path of the processing devices around the stickel can be optimized, so that the so-called island, the unprocessed area, is minimized.

In the sense of the invention, the "opening width" may refer to the clear distance between the processing devices in an opening position, wherein the distance is influenced solely by the relative movement of the processing devices to each other and, if necessary, is fixed by machine design. The opening width can also be produced, for example, when the work vehicle is stationary.

If the superimposition is added by taking into account the opening length of the work apparatus attached to a work vehicle, then in the sense of the invention an "opening width" may refer to the given distance between the processing devices at a location on the route.

It is advantageous here if the closing pulse is sent very early by including the route of the work vehicle without waiting for the end position of the processing devices to be reached during opening. Due to this sequence, the work apparatus can also be opened only partially without the need for a displacement measurement of the processing devices and/or an actuator suitable for approaching intermediate positions. The route can be determined, for example, by a position sensor on the work vehicle or a GPS receiver. It is also possible to link the control device to an electronic speedometer of the work vehicle and to measure the time that begins with the start of the opening control pulse.

If the work apparatus is provided with means for displacement measurement and for moving the processing devices in intermediate positions, the following further embodiments of the method according to the invention are possible:

Depending on the type of processing devices used and the work to be carried out, it may be provided, for example, to maintain or adjust the opening width caused by the recognition of a stickel for subsequent obstacles of the same type. This is useful, for example, when using so-called pre-pruners. After passing the stickel, the working opening width is set to where the two processing devices, each of which having rotating discs in a horizontal plane, are so close together that the two disc arrangements comb into each other.

Another possible variant of the method is that a working opening width can be selected between the processing devices that is smaller than the stickel width plus a safety margin. This assumes that the stickels are perpendicular to the row, or at least do not incline transversely with respect to the longitudinal axis of the row.

It is also possible to calculate the inclination of the linear structure recognized as a stickel with respect to an image horizon or other reference plane, in particular its lateral inclination with respect to the longitudinal axis of the plant row. In addition, a stickel standing crooked laterally in the row can be recognized and the required opening width, formed by a combination of a suitable opening width with a certain opening length, can be calculated between the processing devices in order to avoid a collision with the stickel even when inclined. It can also be recognized that a stickel is inclined in the longitudinal or row direction, i.e., that it tilts back against the direction of travel. In this case, the camera may recognize that the upper section of the stickel has already been passed. At the same time, however, the lower part can still protrude so far that a collision with the processing devices can occur. Therefore, the closing pulse can be delayed beyond the inclination recognition, if necessary.

The electronic camera can be arranged on a crossbeam of the holding equipment or on the work vehicle in such a way that it is located on the inside of the row facing the work vehicle.

According to the invention, a lateral attachment is preferred, in which the camera is positioned offset from the row in the operation and looks vertically or obliquely from the side to the row immediately in front of the processing devices, since in a lateral arrangement a larger extent of the linear structure can be recognized by image recognition than in a view from above. In order to ensure that stickels are reliably recognized during image processing as linear structures that qualify as an obstacle, optical distortions are eliminated, especially when the camera is arranged laterally, in particular if the camera is only a short distance from the plant row. However, lenses with a small focal length, which cause the distortions, must be used in order to be able to capture a sufficiently large image region at the given short distance between the camera and the plants.

The distortion correction is preferably carried out mathematically on the recorded electronic image file before it is analyzed with regard to structure recognition. For this purpose, the captured image is compressed concavely from the lateral edges, possibly also from the upper edge of the image and/or from the lower edge of the image. The compression factor can be adjusted in a calibration process while the camera is pointed at a stickel in the field of view. For this purpose, the orientation of the camera is first fixed during calibration and then the electronic image recorded above it is displayed to the operator before or during image processing. The horizontal and, if necessary, vertical compression can be adjusted by the operator until the stickel is visible in the image as a linear, especially straight, structure and is recognized as such by the image evaluation algorithm implemented in the control device. Automated calibration is also possible by the operator positioning the work apparatus such that there is a stickel in the camera's field of view.

In order to distinguish between the stickels, which are oriented perpendicular to or at an acute angle to the ground surface, and trellis wires often running in the rows and parallel to the ground, it may also be provided to determine the width of recognized linear structures and thus to distinguish between stickels and wires. When using an AI unit during teaching, this distinction can also be taught by appropriate image selection and marking.

Inclination can be used as a further distinguishing criterion. If the recognized angle of inclination of the linear structure with respect to the ground surface is more than about 45°, it is a stickel, while linear structures that are approximately horizontal in the image section are to be identified as wires or tensioning devices belonging to the wires.

In addition to the stickels, which are always linear structures that reach to the ground, other image patterns of obstacles can be taught so that they are also recognized by the image recognition device and a control pulse is triggered for opening the work apparatus. Such obstacles are, for example, the tensioning devices provided at the end of the row for the trellis wires.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
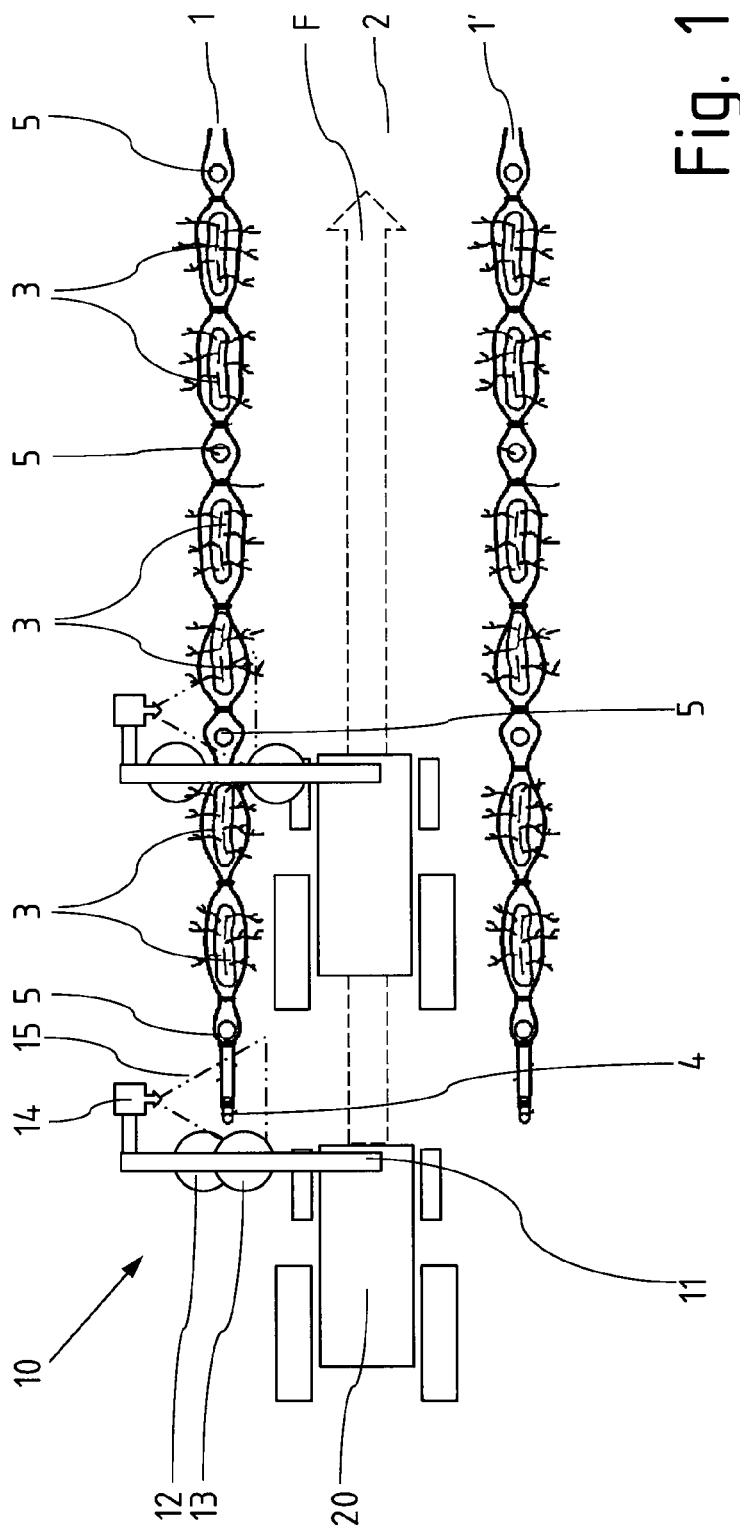
FIG. 1 shows a work vehicle between two rows of a vineyard in a schematic view from above.

FIG. 1 schematically shows from above two rows 1, 1' of a vineyard with an intermediate operation 2. A large number of vines 3 are in a linear arrangement, each forming a row 1, 1'. It contains several stickels 5. At the end of the row there is another, inclined stickel 4, through which the preload is applied to the wire trellises extending between the stickels 5.

A pre-pruner represents a work apparatus 10, which is permanently connected to a tractor as a work vehicle 20. The work apparatus 10 comprises a piece of holding equipment 11 with a crossbeam that reaches over the row 1. Two sets of rotating pre-pruner discs form a pair of processing devices 12, 13, a so-called basket. These are connected to the crossbeam and equipped with an adjuster in such a way that they can move outwards from the row 1 at right angles to the direction of travel F.

The illustration of the work apparatus 10 on the left in FIG. 1 shows the entry into the row 1. The processing devices 12, 13 are close to each other or comb into each other. A camera 14 captures a field of view 15 located immediately in front of the processing devices 12, 13 and electronically evaluates it in an image processing device that is part of a control device. The orientation of the field of view 15 of the camera 14 is transverse to the direction of travel F.

In the illustration of the work apparatus 10 in the middle in FIG. 1, a vine 3 has just been passed and a following stickel 5 has been recognized. Therefore, an opening pulse was emitted by the control device. The two processing devices 12, 13 are now at such a distance from each other that the stickel 5 can pass between them.

Figure 2:
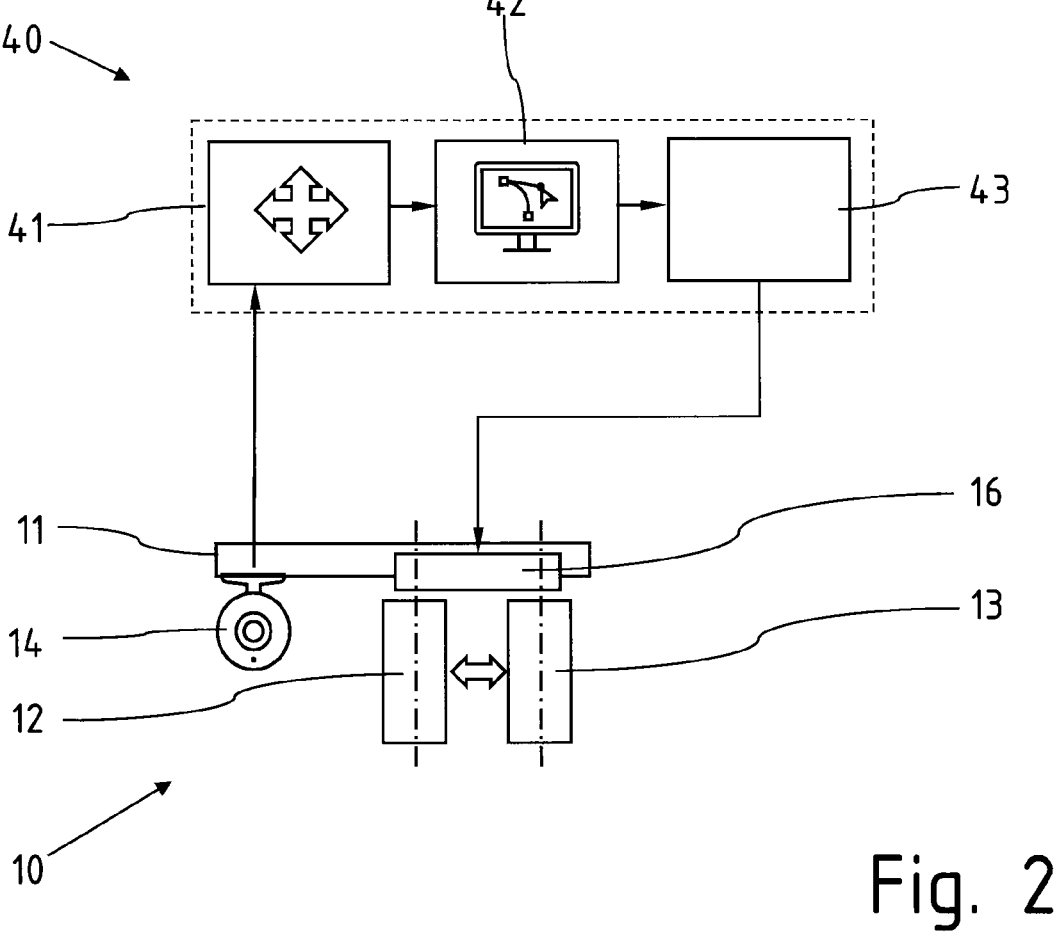
FIG. 2 shows a block diagram of a control device

FIG. 2 shows in a schematic diagram the link between the work apparatus 10 and the control device 40. This includes an image correction device 41 with which, in particular, a compression or stretching of the field of view captured by the camera 14 and stored in an image file can be carried out in at least one dimension. The image thus corrected is checked for the presence of linear structures in an image recognition device 42. If such a structure is recognized, at least one actuator 16 is actuated via a switching unit 43 in order to move the two processing devices 12, 13 apart.

Figure 3:
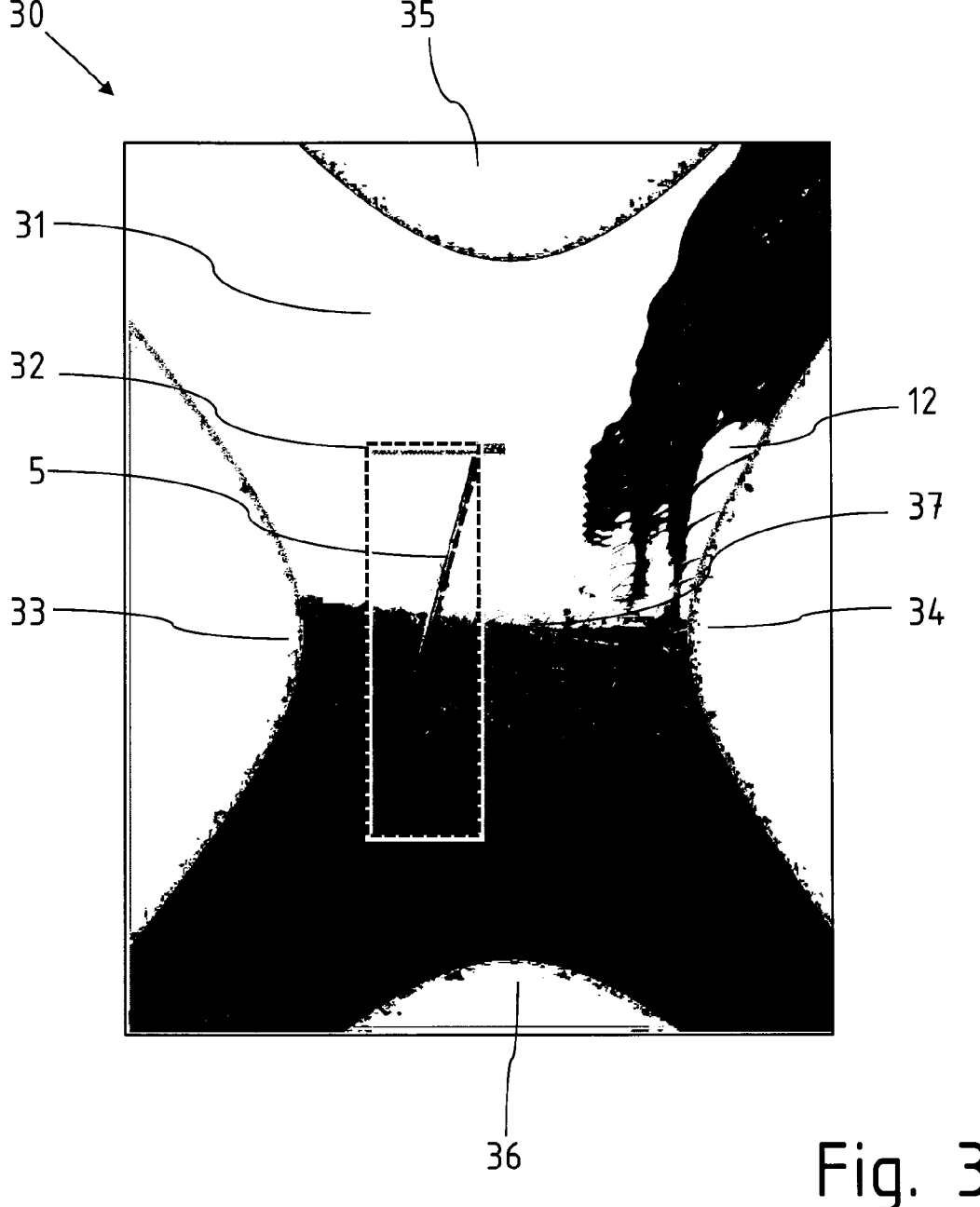
FIG. 3 shows a camera shot.

FIG. 3 renders the contents of an electronic image file 30. The image region 31 has been corrected by horizontal and vertical compression zones 33, 34, 35, 36 in such a way that, for example, an image horizon 37 runs straight. As a result, a stickel 5 can also be recognized as a straight linear structure, which is here marked with a marking 32 as a linear structure recognized by the image recognition device 42. Since the linear structure extends from the floor to the working area of the work apparatus, it qualifies as an obstacle, so that if such a structure is recognized, an opening movement must be triggered.

Figure 4:
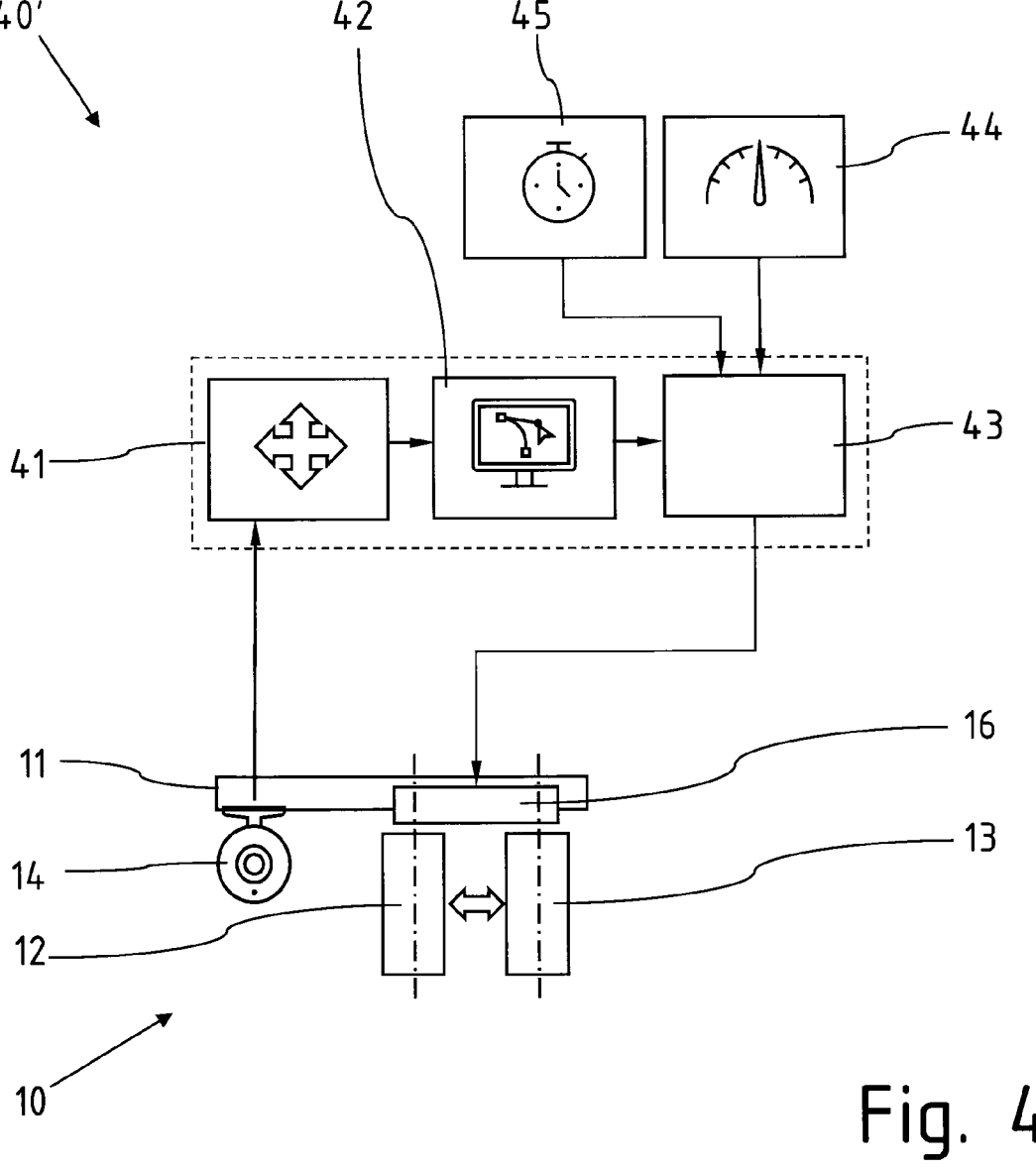
FIG. 4 shows a block diagram of a control device.

FIG. 4 shows in a further block diagram the linking of the work apparatus 10 with a control device 40' according to a second embodiment. In addition to the image correction device 41, the image recognition device 42 and the switching unit 43, this includes a speed sensor 44 and a timer 45, so that a distance of the work vehicle and the associated work apparatus 10 can be determined by linking time and speed.

Figure 5:
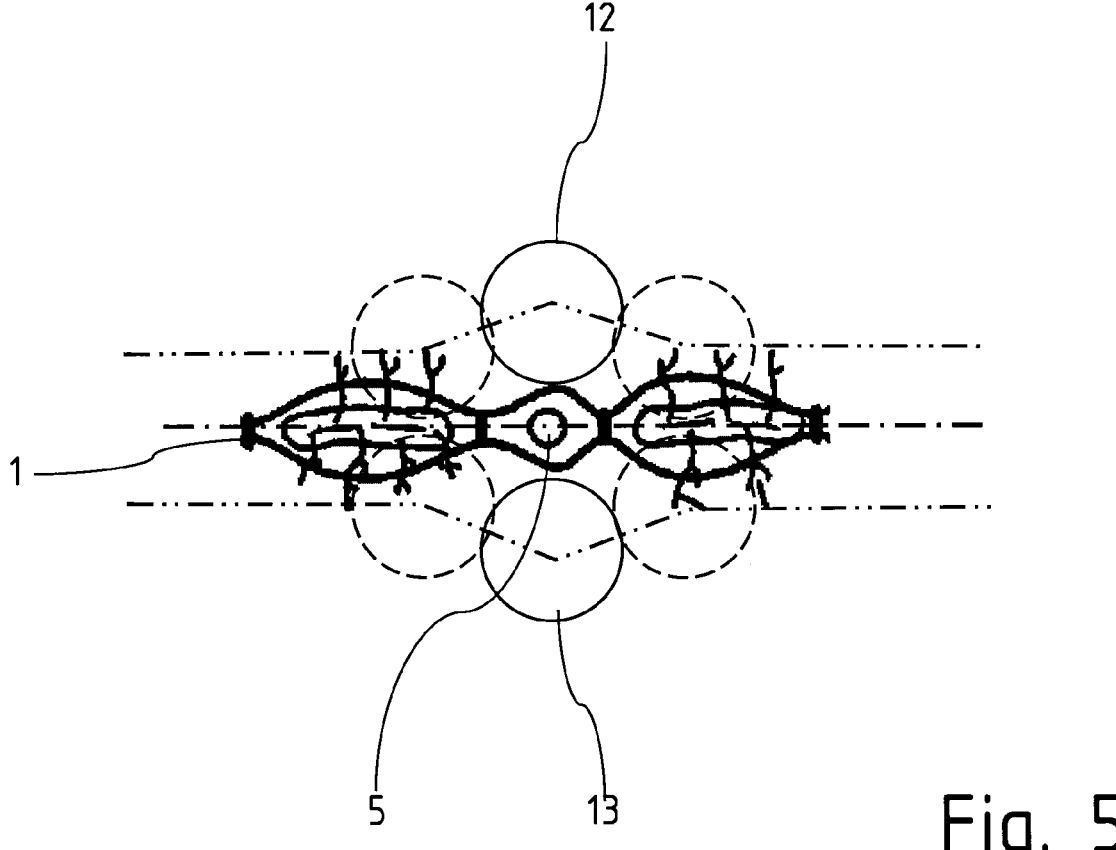
FIG. 5 shows the movement of the processing devices in the area of a stickel, in a schematic view from above.

FIG. 5 shows in an enlarged partial view of FIG. 1 the path of the pair of processing devices 12, 13 around the stickel 5, wherein the path in its optimized form is represented in each case by a dash-dotted line.

Figure 6:
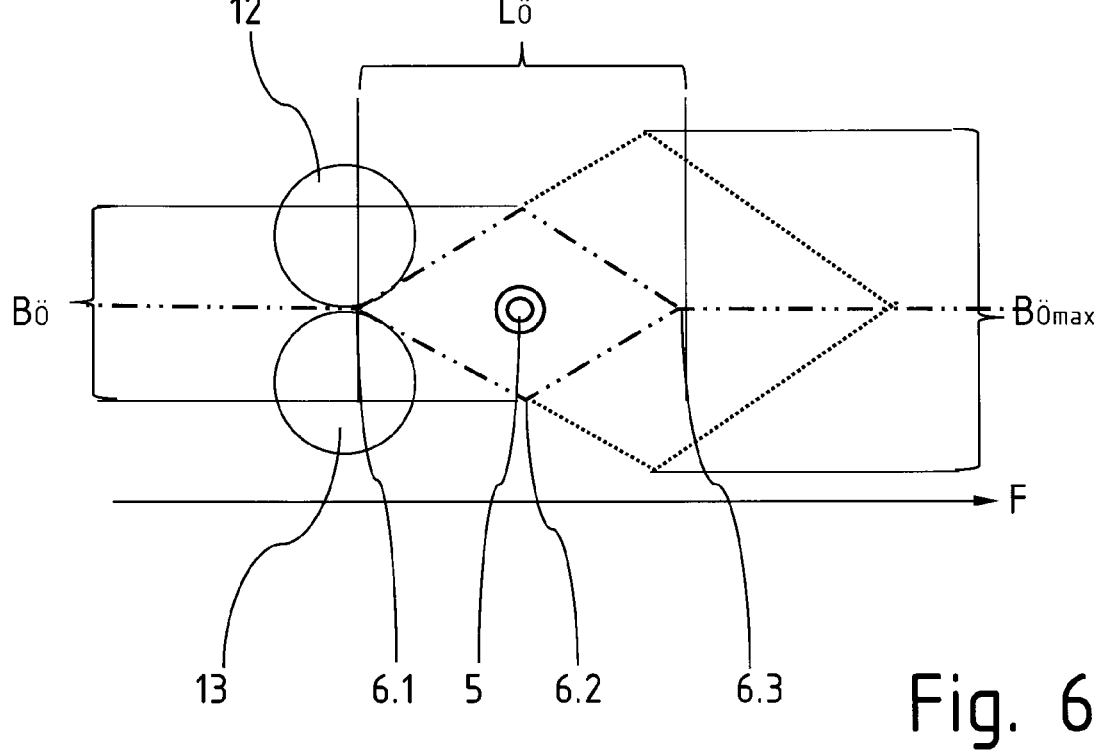
FIG. 6 is a schematic representation of the opening width and length in the processing devices, in a schematic view from above.

FIG. 6 is a schematic representation for the movement of the processing devices 12, 13 shown in FIG. 5. From a working position or a closing position of the processing devices 12, 13 at a point 6.1, an opening is established in the direction of travel F, still behind the stickel 5, to an opening position with an opening width Bö at a point 6.2 and from there back to the working position at a point 6.3 in front of the stickel 5. Thus, until the return to the working position, the opening between the points 6.1, 6.3 was present over the opening length Lö.

While the dash-dotted lines represent the real distance between the processing devices 12, 13, the dotted lines mark the possible maximum distance of the processing devices 12, 13 until a mechanically or otherwise limited, maximum opening with an opening width $Bö_{max}$ is reached. In the schematic diagram in FIG. 6, the control pulse for opening was issued at the point 6.1. During the movement of the processing devices 12, 13 to their maximum possible opening position, the switching pulse for closing was already given at the point 6.2, i.e., at about half of the intended opening length Lö. As a result, the opening width $Bö_{max}$ at the point 6.2 was only about 60% of the maximum possible width $Bö_{max}$. Consequently, the unprocessed area around the stickel 5, which can be seen in FIG. 6 as a rhombus, is significantly smaller than it would have been if the maximum possible opening position $Bö_{max}$ had been reached in accordance with the dotted lines.

This type of control pulse superposition is made possible by the fact that the necessary opening length Lö is either stored as a parameter in the control device or that the distance between the processing devices 12, 13 and the stickel in the row direction is determined by the image recognition device and the necessary opening length Lö is calculated from this, for example as twice the measured distance between the recognized stickel 5 and the processing devices 12, 13.

Figure 7:
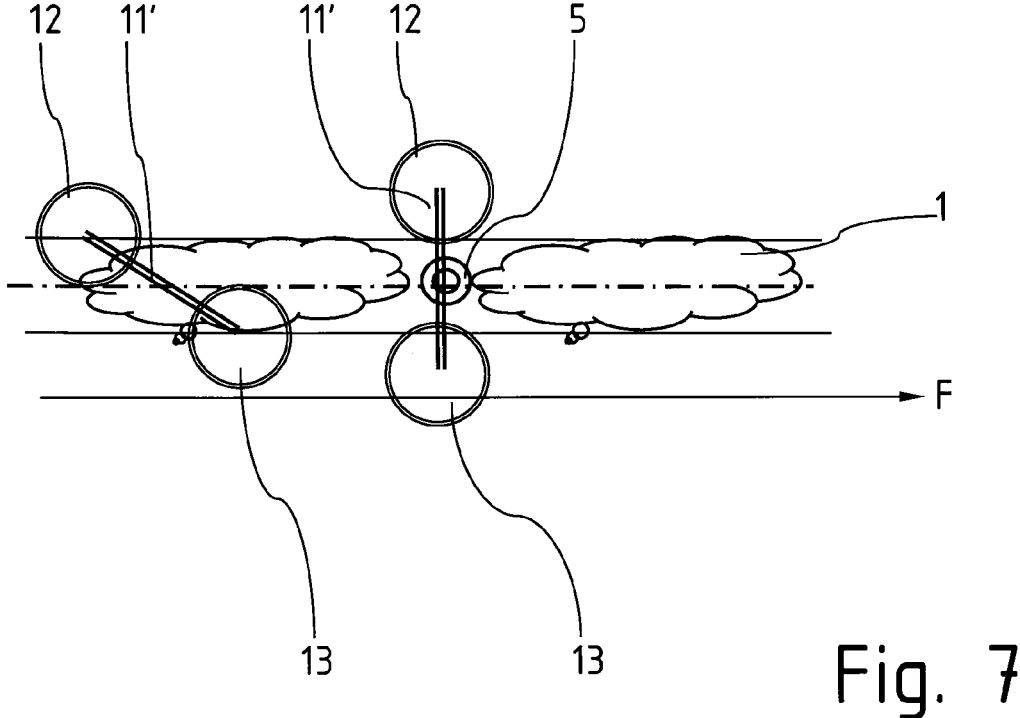
FIG. 7 shows the movement of the processing devices in the area of a stickel according to an example, in a schematic view from above.

FIG. 7 shows how an opening width is established in a pair of processing devices 12, 13 in order to be able to travel past a stickel 5 as an obstacle. The processing devices 12, 13 are held on a piece of holding equipment which is placed at an angle with respect to the direction of travel F along the row 1. As a result, the processing devices 13 are located in the direction of travel F in front of the processing devices 12 on the other side of the row 1. Seen in the direction of travel F, there is no opening between the processing devices 12, 13, although they are oriented in the direction of their holding equipment 11' at a constant distance from each other. Shortly before reaching the obstacle, the entire arrangement of holding equipment 11' and processing devices 12, 13 is swiveled in such a way that the holding equipment 11' is positioned transversely to the direction of travel F or longitudinal direction of the row 1. Now the constant distance between the processing devices 12, 13 can be used as an opening width and the stickel 5 can be passed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling an opening of a work apparatus, the work apparatus being a pre-pruner having processing devices for viticulture, and the processing devices being rotating shearing discs that are arranged in pairs, the method comprising:

attaching the work apparatus to a work vehicle, the work apparatus comprising at least one piece of holding equipment that reaches over a row of plants and on which at least one pair of the shearing discs is held;

arranging the at least one pair of the shearing discs such that a respective one of the shearing discs is positioned on each side of the row of plants;

moving at least one of the shearing discs in relation to the other shearing disc of the at least one pair of the shearing discs via at least one actuator, such that a clear opening is established between the shearing discs, the clear opening being changeable with regard to at least of an opening width or an opening length, or the piece of holding equipment that holds the at least one pair of the shearing discs is adapted to be swiveled in relation to a longitudinal direction of the row of plants, via the at least one actuator, such that the clear opening is established between the shearing discs that is change-able with regard to the at least of the opening width or the opening length; the camera being aligned vertically or at an angle from a side of the row of plants generating and storing at least one image recording of at least one field of view located directly in front of the at least one pair of the shearing discs in a direction of travel of the work vehicle, the at least one image recording being generated and stored in an electronic image file on an ongoing basis or in regular intervals in relation to the travel time and/or travel distance of the work vehicle, the at least one image recording being generated by at least one electronic camera that is aligned vertically or at an angle from a side of the row of plant;

checking the image file in an image recognition device of a control device, at least for the presence of linear structures in at least one image region of the image file; and sending, when a linear structure that qualifies as an obstacle is recognized, a control pulse by the control device to the actuator to trigger an opening movement that establishes or increases the clear opening between the shearing discs, wherein the shearing discs are movable into an opening position and into a closing position while the work vehicle is moving in the direction of travel, the opening position and the closing position being defined end positions.

2. A method for controlling an opening of a work apparatus having pairwise arranged processing devices for viticulture, the method comprising:

attaching the work apparatus to a work vehicle, the work apparatus comprising at least one piece of holding equipment that reaches over a row of plants and on which at least one pair of the processing devices is held;

arranging the at least one pair of the processing devices such that a respective one of the processing devices is positioned on each side of the row of plants;

moving at least one of the processing devices in relation to the other processing device via at least one actuator, such that a clear opening is established between the processing devices, the clear opening being changeable with regard to at least of an opening width or an opening length, or the piece of holding equipment comprising the processing devices is adapted to be swiveled in relation to a longitudinal direction of the row of plants, via the at least one actuator, such that the clear opening is established between the processing devices that is changeable with regard to the at least of the opening width or the opening length;

generating and storing at least one image recording, via at least one electronic camera, for at least one field of view located in front of the processing devices in an electronic image file on an ongoing basis or in regular intervals in relation to the travel time and/or travel distance of the work vehicle;

checking the image file in an image recognition device of a control device, at least for the presence of linear structures in at least one image region of the image file; and sending, when a linear structure that qualifies as an obstacle is recognized, a control pulse by the control device to the actuator to trigger an opening movement that establishes or increases the clear opening between the processing devices, wherein after delivery of the control pulse, a position of the linear structure is tracked by ongoing evaluation of further image files subsequently recorded from the at least one field of view.

3. A method for controlling an opening of a work apparatus having pairwise arranged processing devices for viticulture, the method comprising:

attaching the work apparatus to a work vehicle, the work apparatus comprising at least one piece of holding equipment that reaches over a row of plants and on which at least one pair of the processing devices is held;

arranging the at least one pair of the processing devices such that a respective one of the processing devices is positioned on each side of the row of plants;

moving at least one of the processing devices in relation to the other processing device via at least one actuator, such that a clear opening is established between the processing devices, the clear opening being changeable with regard to at least of an opening width or an opening length, or the piece of holding equipment comprising the processing devices is adapted to be swiveled in relation to a longitudinal direction of the row of plants, via the at least one actuator, such that the clear opening is established between the processing devices that is changeable with regard to the at least of the opening width or the opening length;

generating and storing at least one image recording, via at least one electronic camera, for at least one field of view located in front of the processing devices in an electronic image file on an ongoing basis or in regular intervals in relation to the travel time and/or travel distance of the work vehicle;

checking the image file in an image recognition device of a control device, at least for the presence of linear structures in at least one image region of the image file; and sending, when a linear structure that qualifies as an obstacle is recognized, a control pulse by the control device to the actuator to trigger an opening movement that establishes or increases the clear opening between the processing devices, wherein a second control pulse is sent by the control device to the actuator to trigger a closing movement which reduces the opening width between the shearing discs when the linear structure disappears from the at least one image region or reaches a target specified in the at least one image region.

4. The method according to claim 1, wherein a lateral inclination of the linear structure with respect to an image horizon or other reference plane is calculated by the control device, and wherein the opening width for the shearing discs necessary for the opening movement is calculated from the lateral inclination.

5. The method according to claim 1, wherein the at least one image region stored in the image file is electronically compressed or stretched in at least one dimension in an image correction device of the control device before being fed to the image recognition device.

6. The method according to claim 1, wherein the distance between the shearing discs between the opening position and the closing position are adjustable.

7. The method according to claim 1, wherein, in order to change the size of the clear opening between the shearing discs, the clear opening width measured transversely to the longitudinal extension of the row of plants between the shearing discs is changed by changing the distance between the shearing discs.

8. The method according to claim 7, wherein when the work vehicle is moving, in order to change the size of the clear opening between the shearing discs, the opening length measured in the longitudinal extension of the row of plants is changed, in addition to the opening width, by emitting a second control pulse for triggering a closing movement, which follows the control pulse for triggering the opening movement, before the opening position is fully reached.

9. A work apparatus that is a pre-pruner for viticulture and that is to be attached to a work vehicle, the work apparatus comprising:

at least one pair of rotating shearing discs attachable to a piece of holding equipment and designed to reach over a row of plants, wherein a respective one of the shearing discs of the at least one pair of shearing discs is arranged on each side of the row of plants;

an actuator via which at least one of the shearing discs is adapted to be moved in relation to the other shearing disc, such that a clear opening is established between the shearing discs, the clear opening being changeable with regard to at least of an opening width or an opening length, or the holding device with the at least one pair of shearing discs is adapted to be swiveled in relation to a longitudinal direction of the row of plants, such that the clear opening is established between the shearing discs that is changeable with regard to the at least of the opening width or the opening length;

an electronic camera to generate at least one electronic image file from an image acquisition of at least one field of view, the camera being aligned vertically or at an angle from a side of the row of plants, so that the at least one field of view is aligned with a region located directly in front of the at least one pair of the shearing discs in a direction of travel of the work vehicle; and a control device, wherein the control device includes an image recognition device configured to check the at least one electronic image file for the presence of linear structures that qualify as an obstacle in at least one image region of the at least one image file, wherein the control device is configured to provide a control pulse to the actuator if a linear structure is recognized in the image recognition device to trigger an opening movement that establishes or increases the clear opening between the shearing discs, and wherein the shearing discs are movable into an opening position and into a closing position while the work vehicle is moving in the direction of travel, the opening position and the closing position being defined end positions.

10. The work apparatus according to claim 9, wherein a position sensor or a GPS receiver for measuring a travel distance of the work vehicle is arranged on the work vehicle and/or connected to the control device for data transmission.

11. The work apparatus according to claim 9, wherein the control device is connected to an electronic speed measuring device.

12. The work apparatus according to claim 9, wherein the control device comprises an image correction device upstream of the image recognition device for the elimination of optical distortions.

13. The method according to claim 1, wherein the holding equipment is a crossbar on which both shearing discs of the at least one pair of shearing discs are mounted.

14. The method according to claim 13, wherein when the clear opening is established by the at least one of the shearing discs being moved in relation to the other shearing disc, such movement occurs longitudinally along the cross-bar, or wherein when the clear opening is established by swiveling of the crossbar, both shearing discs of the at least one pair of shearing discs are fixed in position with respect to a longitudinal extent of the crossbar.

* * * * *